No. 620,295. Patented Feb. 28, 1899.
J. C. FLEMING.
WHEEL FOR BICYCLES.
(Application filed July 15, 1898.)
(No Model.)
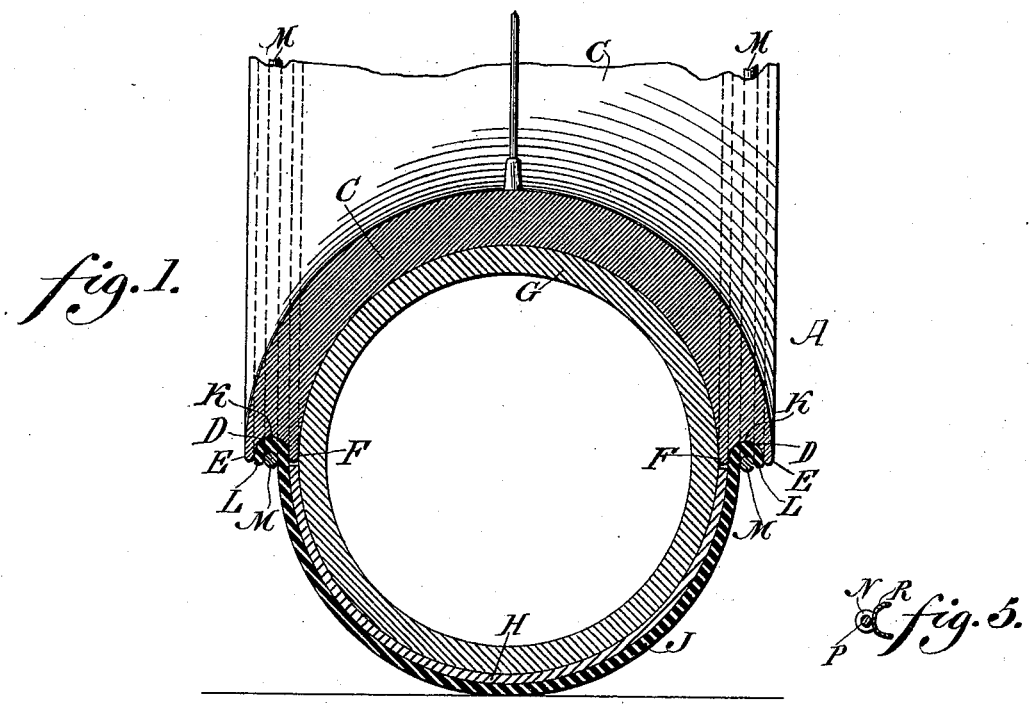
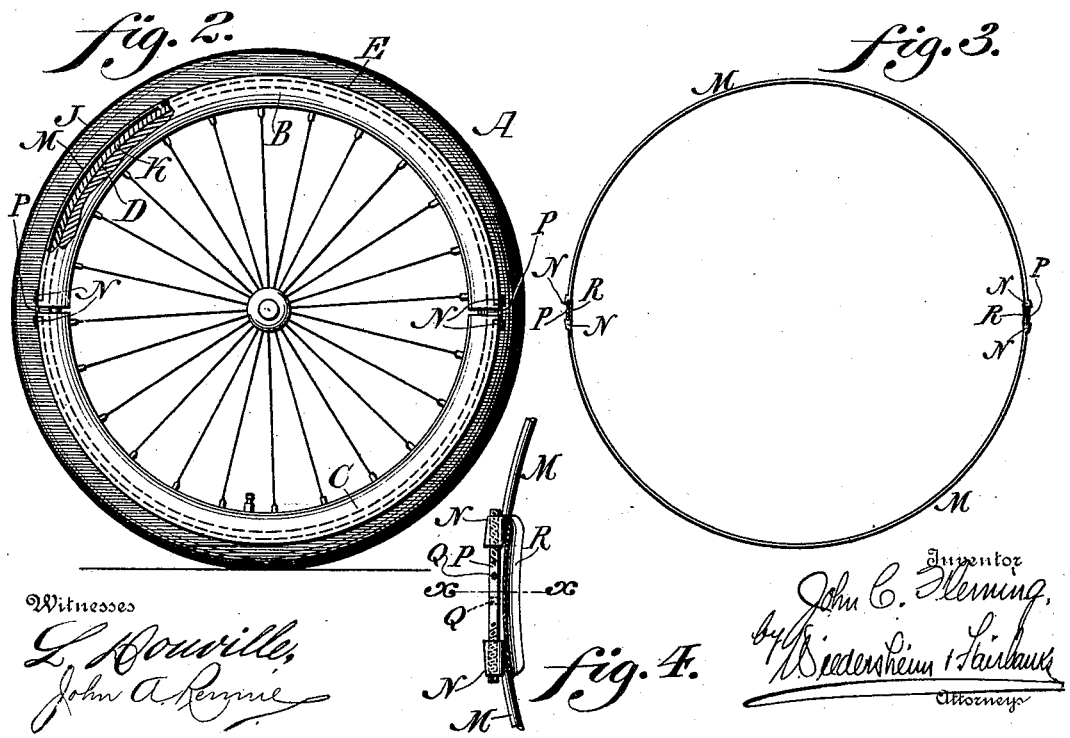

UNITED STATES PATENT OFFICE.

JOHN C. FLEMING, OF PHILADELPHIA, PENNSYLVANIA.

WHEEL FOR BICYCLES.

SPECIFICATION forming part of Letters Patent No. 620,295, dated February 28, 1899.

Application filed July 15, 1898. Serial No. 686,013. (No model.)

*To all whom it may concern:*

Be it known that I, JOHN C. FLEMING, a citizen of the United States, residing in the city and county of Philadelphia, State of Pennsylvania, have invented a new and useful Improvement in Wheels for Bicycles and other Vehicles, which improvement is fully set forth in the following specification and accompanying drawings.

My invention consists of an improved construction of wheels for bicycles and other vehicles, the rims or fellies of which are made in sections, so that they can be readily assembled without necessitating the employment of skilled labor, provision being made for the protection of the inner tube by the employment of a guard or strip of leather or similar material, which cannot be readily punctured, the parts being held in assembled position by the employment of an outer tread or strip of rubber or similar material, which can be easily replaced when worn, said tread being held in proper position by means of wire rings or sectional hoops which encircle the rim or felly of the wheel and are provided with a turnbuckle or similar device which can be tightened and loosened, whereby the parts can be readily placed in assembled position and the wheel is tightened or strengthened to a great degree.

It further consists of novel details of construction, all as will be hereinafter set forth, and particularly pointed out in the claims.

Figure 1 represents a transverse section of a wheel for bicycles and other vehicles embodying my invention. Fig. 2 represents, on a reduced scale, a side elevation of a bicycle-wheel, portions thereof being broken away to show the manner of assembling the parts. Fig. 3 represents a side elevation of one of a pair of hoops employed to hold the rims or sections of the tire in position. Fig. 4 represents, on an enlarged scale, a side elevation of a portion of Fig. 3. Fig. 5 represents a horizontal section on line $x$ $x$, Fig. 4.

Similar letters of reference indicate corresponding parts in the figures.

Referring to the drawings, A designates a bicycle-wheel, the rim or felly of the same being made, preferably, of wood or other material, formed in sections B and C, the outer periphery of said sections at either side thereof being provided with the concave seat or socket D, it being also noted that the edges or walls E and F of said socket are of substantially the same thickness, so that the rim is not weakened, as will be explained.

G designates an inner tube which is adapted when inflated to be located in the concavity of the sections B and C of the rim or felly, the outer portion of said tube G being protected by means of the strip or guard H, of leather or similar material, it being noted that said strip is of substantially the same thickness as the wall F of said rim.

J designates the resilient tread of the wheel, the same consisting of a strip of suitable material, by means of which the parts are held in assembled position, as will be understood from Fig. 1, said tread J having its edges K preferably thickened, if desired, and turned over to form the lips L, whereby a socket or seat is formed in which the wire rings or hoops M are placed on either side.

The construction of the hoops M will be apparent from Figs. 3 and 4, it being noted that the same are made in sections, the juxtaposed ends of which have the eyes N, which latter are provided with right and left hand threads, as will be understood from Fig. 4, said threads being engaged by a rod P, having similar threads cut thereon and provided with the openings Q therein at right angles, the above device serving as a turnbuckle, wherefrom it will be apparent that by rotating the threaded stem P the sections M of the hoops will be brought into juxtaposition to the required extent, whereby the sections B and C of the rim and their adjuncts will also be firmly held in assembled position.

It will be apparent from the foregoing that the effect of the strip H will be to prevent the puncture of the tube G, since any article—such as tacks, glass, &c.—which might puncture the tread J cannot puncture the strip or guard H, whereupon it will be seen that a highly-serviceable and simply-constructed tire is produced in accordance with my invention, the wheel being much strengthened and being much easier to ride and propel, and I attain great advantages over the wheels now in use wherein as the inflation decreases the wheel becomes weakened, because the strengthening power is reduced, said power being the rubber tire when inflated, whereas in my invention the wire rings or hoops sustain the rim under all conditions. It will also be apparent that the parts can be readily assembled or disconnected, according to requirements, and in case the tread J becomes worn or punctured from any cause the same can be expeditiously removed and a new one substituted in its place.

R designates strips secured in the present instance to the extremities of one of the sections of the hoop M, one end of each of said strips projecting beyond the extremities of the section (of the hoop M) to which they are secured, so that the projecting portions of the strips R close the gap between the adjacent eyes N and also prevent the edges of the latter from injuring the tread J, it being apparent that the projecting portions of the strips R are adapted to slide upon the extremities of one of the sections of the hoop M when the threaded stem P is rotated.

Having thus described my invention, what I claim as new, and desire to secure by Letters Patent, is—

1. In a wheel for bicycles and other vehicles, a rim made in sections, the latter having grooves therein, on either side of the central concavity of said rim, an inflatable resilient tube seated in said concavity, a tread of rubber or other resilient material located exterior to said tube and having its edges deflected and seated in said grooves, a sectional wire ring or hoop seated in each of said grooves, each of said hoops having eyes in their juxtaposed ends, said eyes being provided with right and left hand threads, a rod similarly threaded and engaging said eyes, grooved or curved strips attached to one of each hoop-sections at or near the eye thereof, each of said strips being located out of alinement with its hoop and being adapted to close the openings between said eyes.

2. In a wheel for bicycles and other vehicles, the combination of a tread and guard, an inner tube seated in the sections of the rim, grooves in said rim on either side of the concavity wherein said inner tube is seated, sectional wire rings or hoops each having eyes in their juxtaposed ends, said eyes being provided with right and left hand threads, a rod similarly threaded and engaging said eyes, groove-strips attached to one of said hoop-sections at or near the eye thereof, and being adapted to close the openings between said eyes, said strips being located out of alinement with said rings, the latter being detachable from the rim-sections.

JOHN C. FLEMING.

Witnesses:
  JOHN A. WIEDERSHEIM,
  E. HAYWARD FAIRBANKS.